Dec. 10, 1968     R. E. ASHLEY     3,414,985
TEACHING APPARATUS
Filed Jan. 18, 1967     4 Sheets-Sheet 2
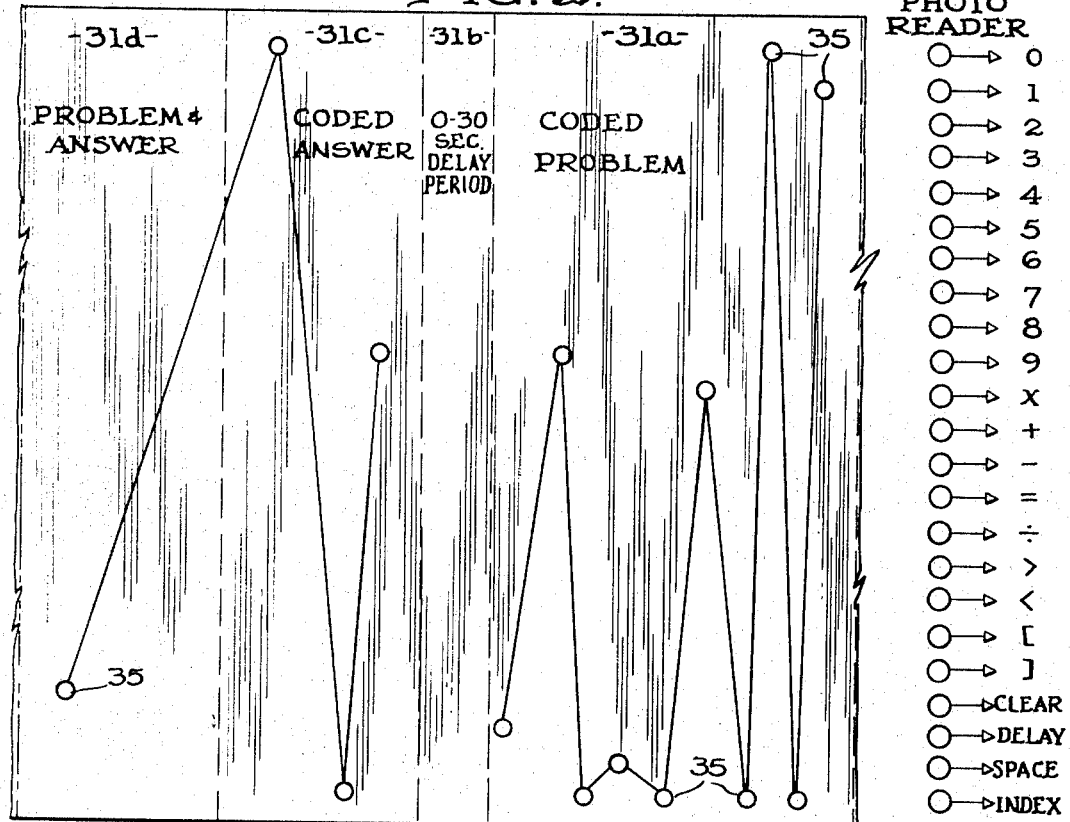
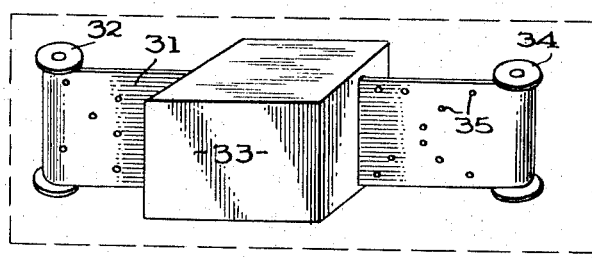
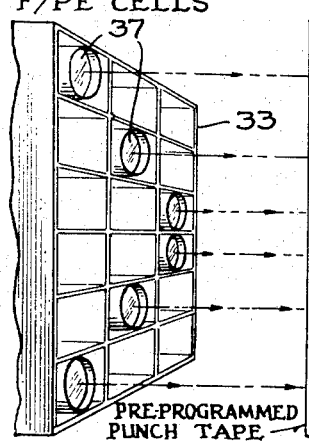
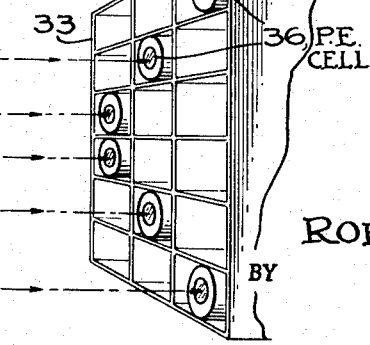
INVENTOR
ROBERT E. ASHLEY
BY *Emory G. Groff Jr.*
ATTORNEY Dec. 10, 1968  R. E. ASHLEY  3,414,985
TEACHING APPARATUS
Filed Jan. 18, 1967  4 Sheets-Sheet 3

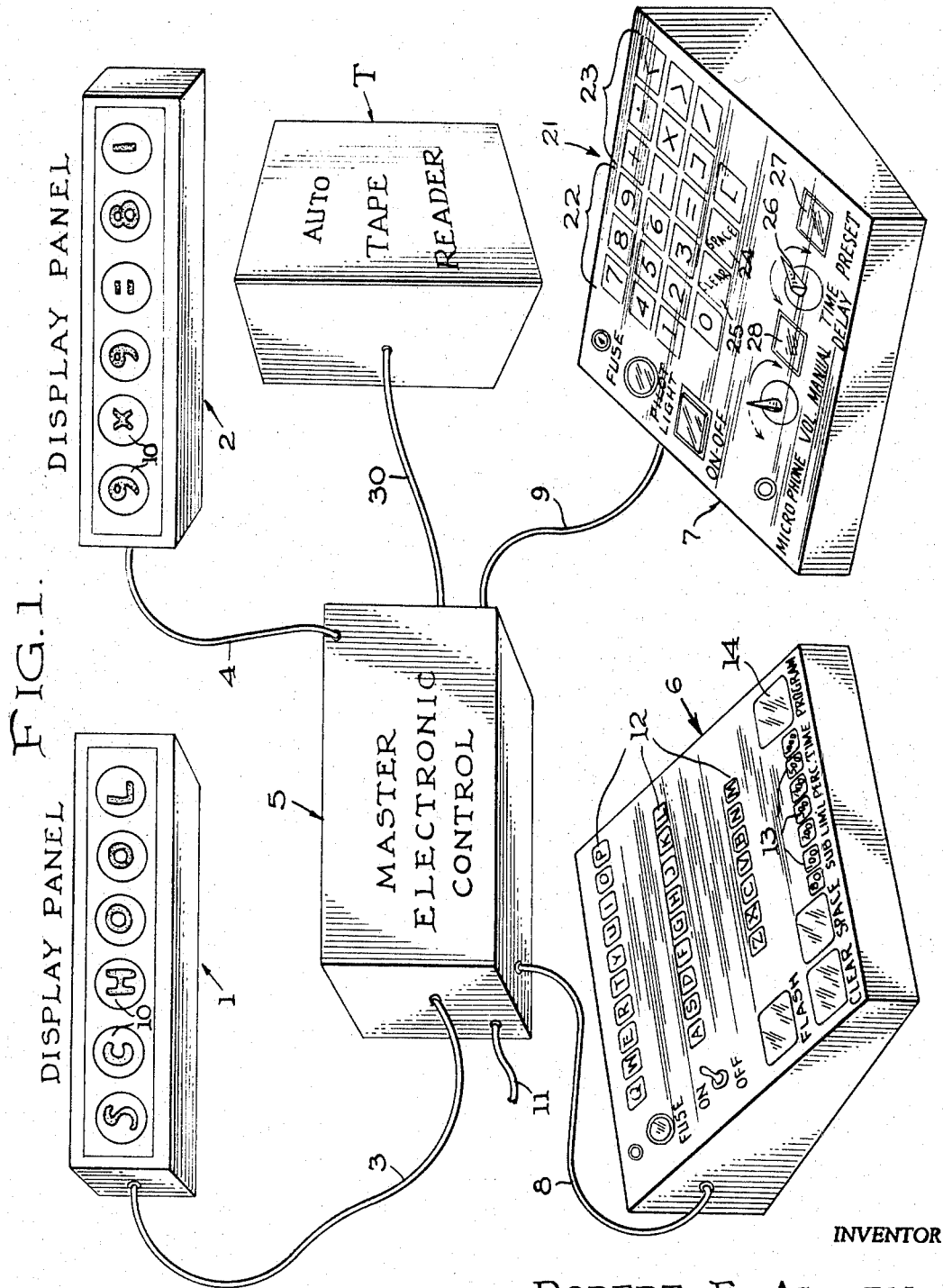

INVENTOR
ROBERT E. ASHLEY
BY
ATTORNEY

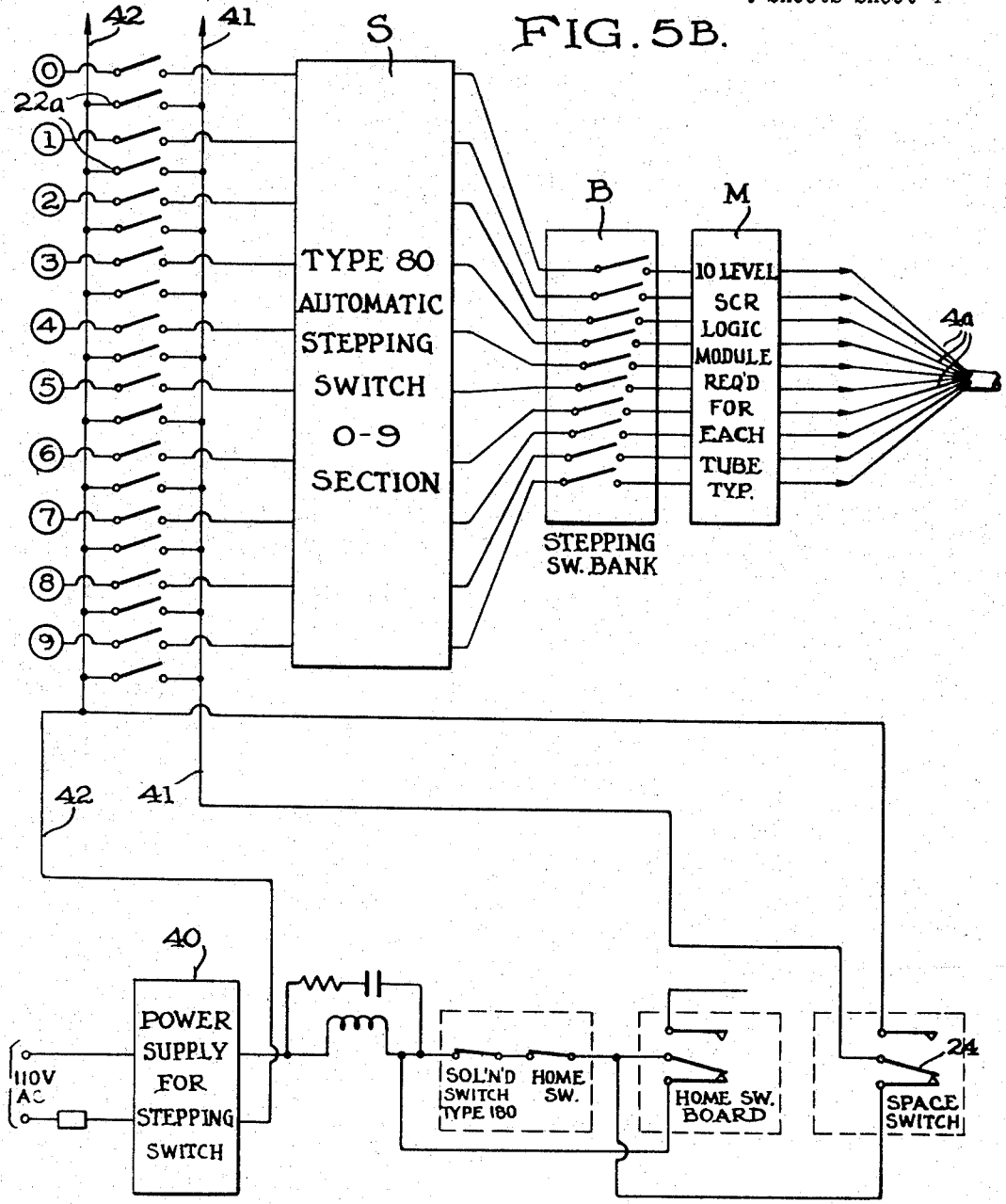

United States Patent Office 3,414,985
Patented Dec. 10, 1968

3,414,985
TEACHING APPARATUS
Robert E. Ashley, Texarkana, Tex., assignor to Educational Data Systems, Inc., Texarkana, Tex., a corporation of Texas
Filed Jan. 18, 1967, Ser. No. 610,046
1 Claim. (Cl. 35—8)

ABSTRACT OF THE DISCLOSURE

A visual instruction system consisting of a classroom display panel and an instructor's control unit, in which alpha or numeric information may be sequentially programmed into the control unit by an instructor's keyboard or by an automatic tape reader and subsequently presented to the classroom via the display panel in varying time durations or in varying intervals between presentation of a problem and its respective correct answer.

---

This invention relates generally to a teaching apparatus and more particularly to a visual instruction system adapted to be controlled by a teacher and serving in the instruction of groups of students.

In general, visual aids serving for the instruction of groups of pupils are well known, however, most of these prior known devices suffer from many disadvantages. By the present arrangement a system is presented which is designed to stimulate the student's interest and speed of comprehension. This is achieved by means of one or more visual display panels preferably positioned in the front of the classroom, and which are automatically controlled electronically by the teacher who may be remotely situated in any part of the classroom and who programs the presentation of preselected indicia by the display panel by means of keyboard type control panels at their disposal.

By the present arrangement, conventional electronic components are combined in a unique manner to provide a visual teaching apparatus far superior to anything heretofore known. This device is particularly designed to provide instruction to elementary grade children, however, its significance will readily be appreciated after considering the description thereof hereinafter and it will be readily noted that there is no limit to the possible applications of the instant apparatus for use in more advanced instruction.

Accordingly, one of the primary objects of the present invention is to provide a teaching apparatus including a visual display panel adapted to be regulated by a remotely situated instructor for the presentation of selected indicia in a predetermined sequence.

A further object of the present invention is to provide a teaching apparatus including a visual display panel controlled remotely by electronic means and having a plurality of elements therein each of which is adapted to present in a preselected sequence any one of a plurality of illuminated indicia.

Still another object of the present invention is to provide a teaching apparatus including a visual display panel having a plurality of elements adapted to be illuminated to present any one of a plurality of indicia, said display panel being regulated by an instructor—controlled panel including means for programming the sequence of and time of illumination of said indicia.

Another object of the present invention is to provide a teaching apparatus including a visual display panel having a plurality of elements adapted to be illuminated to present any one of a plurality of indicia, and actuating means comprising an automatic tape reader for illuminating in a predetermined sequence and for a preselected time interval each of the elements in the display panel.

A further object of the present invention is to provide a teaching apparatus comprising a central master control unit to which may be connected one or more visual display panels each having a plurality of fixed elements capable of being illuminated to present any of various alpha or numeric data as programmed into said master unit by one or more keyboard panels or an automatic tape reader.

With these and other objects in view which will more readily appear as the nature of the invention is better understood the invention consists in the novel construction, combination, and arrangement of parts hereinafter more fully described, illustrated and claimed.

A preferred and practical embodiment of the invention is shown in the accompanying drawings in which:

FIGURE 1 is a perspective view of the various components comprising the present invention.

FIGURE 2 is an enlarged view of a section of preprogrammed perforated tape adapted to be used in the tape reader of the present invention.

FIGURE 3 is a perspective view diagrammatically illustrating the passage of a roll of the programmed tape of FIGURE 2 through sensing means forming a part of the tape reader of the present invention.

FIGURE 4 is a partial perspective view diagrammatically illustrating the sensing means as used in the structure of FIGURE 3.

FIGURES 5A and 5B are portions of a schematic diagram of circuits used in the present invention.

Similar reference characters designate corresponding parts throughout the several views of the drawings.

Figure 5A:
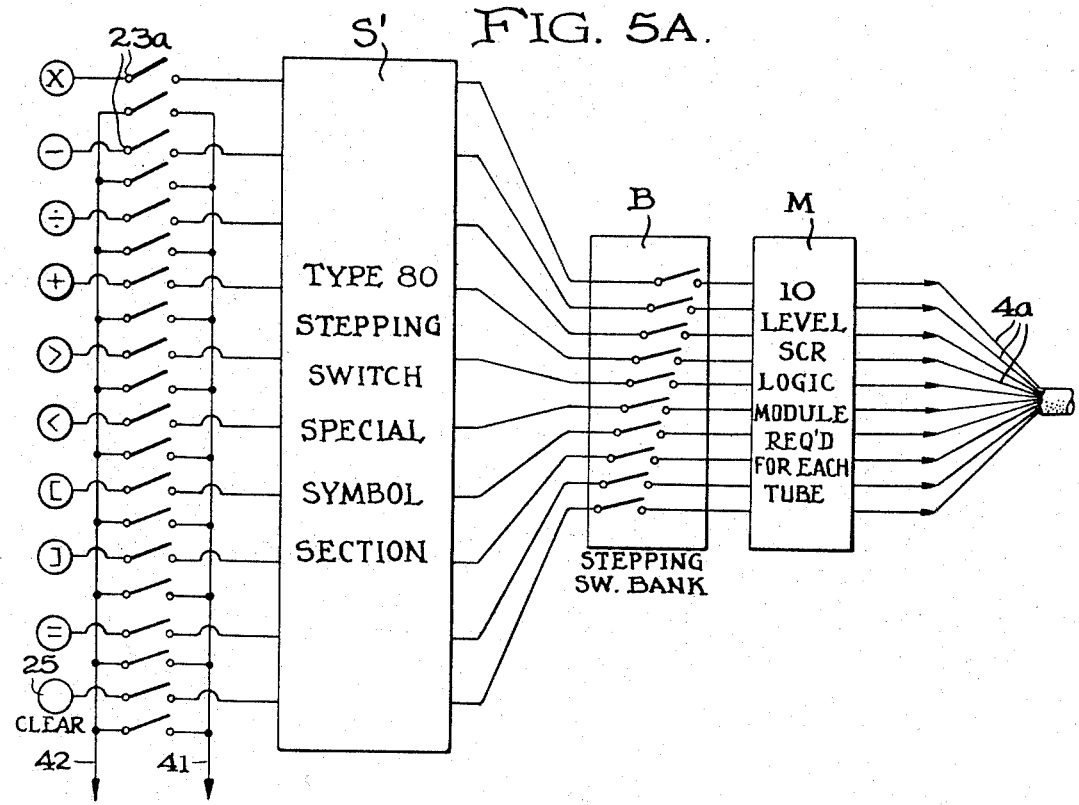

FIGURE 1 of the drawings most graphically illustrates the arrangement of the present invention and discloses a teaching system comprising one or more visual display panels 1 and 2 electrically connected by cables 3 and 4 to a master electronic control unit 5. For regulating or programming the presentations displayed by the panels 1 and 2, one or more keyboard-type control panels 6 and 7 are provided for use by the teacher and are electrically connected to each of the display panels by means of cables 8 and 9 leading to the master control unit 5. As an accessory to the present invention an automatic tape reader T is included for presenting pre-programmed material to the master control unit 5 for automatic display by the panels 1 and 2.

Although each of the elements shown in FIGURE 1 of the drawings are basic to the system of the present invention it will be understood that the number of display panels and their related control panels may be altered as may also the general design and configuration of each of these components. For the presentation of instruction in spelling and English, or foreign languages utilizing the standard twenty-six letter alphabet, so much of the present invention comprising the visual display panel 1, master control unit 5 and word control panel 6 are utilized. For the teaching of basic math and even more advanced types of mathematics, such as algebra, so much of the present system as comprises the visual display panel 2, the master control unit 5 and the math control panel 7 are utilized. The automatic tape reader T will be seen to be adaptable by the teacher in either one of the above two described fields of instruction. The basic principle of operation as well as the arrangement of the electrical components is substantially identical whether considering the word display panel 1 or the math display panel 2 with their respective control means. Thus, a description of the operation and construction of one of these subsystems will suffice for an understanding of the overall teaching apparatus.

The visual display panels 1 and 2 include a plurality of horizontally disposed viewing "windows" 10 which in reality are the exposed outer surfaces of electronic Nixie tubes. These Nixie tubes 10, which are manufactured by the Burroughs Company, are capable of presenting alphanumeric indicia when a preselected number and arrangement of their cathodes are excited by any well known electronic circuitry. The power supply for operating the various components of the teaching apparatus is contained in the master control unit 5 and is operated by means of the power line 11. The word control panel 6 is provided for operating the visual display panel 1 and preferably comprises a standard typewriter keyboard 12 as well as a plurality of additional special keys all of which are actually electrical pushbutton type switches.

In the operation of control panel 6 the instructor depresses any of the various letter keys 12 in the desired sequence for presenting the data programmed into memory for subsequent presentation by the display panel 10. A plurality of subliminal perception time keys 13 are provided on the control panel 6 and may be pre-programmed to provide time steps such as shown in FIGURE 1 of 80, 100, 300, 400, 500 and 1,000 milliseconds. After the instructor has programmed the desired number of letters by actuation of any number of keys 12 in the intended sequence and has depressed the selected subliminal perception time key 13, the programmed data recorded in the master control unit 5 is then presented to the classroom by visual display panel 10 when the program key 14 is depressed.

Referring now to the mathematical sub-system the math control panel 7 will be seen to include a programming keyboard 21 which is similar to an adding machine keyboard and includes the features of automatic step function, automatic clear function and space function. The keyboard 21 includes two primary key groups, namely, the number programming keys 22 and the mathematical sign programming keys 23. As in the case of the word control panel 6 all of the programming keys in the math keyboard 21 are electrical push button switches and ten number programming keys 22 are provided numbered 0 through 9. Each time the instructor depresses one of the keys 22 that number is stored in the master control unit 5 for subsequent presentation. If the key depressed is the first such key actuated during the current problem this number will be stored in the memory bank in the control unit 5 connected to the first one of the Nixie tubes 10 in the display panel 2 and the keyboard will then be stepped for selection of the next number which when selected will be stored in the memory bank for the second tube in the display panel.

Any number of the Nixie tubes 10 in the display panel 2 may be utilized for the presentation of various mathematical signs and these are selected for presentation by the instructor by depressing one of the mathematical sign keys 23, so that this data will then be stored for subsequent presentation to the respective Nixie tube being programmed. Also provided on the keyboard 21 are "space" push button 24 and "clear" push button 25. By depressing the "space" push button 24 the next Nixie tube 10 in line to be programmed will be left blank when the display panel is illuminated and the keyboard will be stepped for selection of the data for the next Nixie tube. The "clear" button 25 functions to clear all of the previously programmed memory banks in the master control unit 5 in case an erroneous information entry is programmed for storage and presentation and thus prepares the entire keyboard 21 for a new or correct programming. A variable time delay control switch 26 is provided and may be utilized to regulate the time interval between presentation of the problem portion of the program and presentation of the answer portion thereof. For example, the range of the time delay available may be selected anywhere from 0–30 seconds and by use of this control the data shown in the first four Nixie tubes 10 in the display panel 2 of FIGURE 1 would appear instantly when the instructor depressed the "present" button 27, however, the answer appearing in the last two Nixie tubes 10 in the panel 2 would not appear to the classroom until passage of the time delay interval as set by the switch 26.

The possibilities from the standpoint of instruction technique with the above described apparatus are numerous. For example, the students, knowing that the answer will appear in ten seconds following presentation of the problem, may be self-tested by attempting to arrive at the correct solution before the answer is presented by the display panel 2. On the other hand, the teacher may administer a test designed to be subsequently graded by merely presenting a series of problems without any presentation of the solutions. In any case it has been found to be highly desirable when instructing students in either math or languages to introduce a time interval factor as achieved by the present teaching apparatus as this method of instruction requires the student to be highly alert and produces a high degree of awareness.

By depressing the "manual" push button 28 the instructor is able to instantaneously present from the display panel 2 any data from a key 22 or 23 as soon as it is depressed should there be no need or desire to wait until all of the data has been programmed into the memory banks for all of the tubes 10.

The systems heretofore described may be supplemented by the inclusion of the automatic tape reader T which is electrically connected to the master control unit 5 by means of a cable 30. Using pre-programmed tape in the auto reader T it is not necessary for the instructor to manipulate the keyboard 12 of the word control panel 6 or the keyboard 21 of the math control panel 7 since all operations for regulating the master control unit 5 and thus the visual display panels 1 and 2 will be initiated by means of the tape acting through the auto reader T. Merely by inserting a pre-programmed tape into the auto reader the instructor may present programs of any nature that may be expressed in numbers, letters, words, sentences, paragraphs, etc. Thus, an entire period of instruction may be presented to a class of students by means of the auto reader which will present a complete program of problems and answers which may be sequenced in any desired manner. The construction of the auto tape reader T is shown in FIGURES 2, 3 and 4, wherein it will be seen that a paper tape 31 is adapted to be driven by any suitable means from a storage spool 32 through a reading head 33 to a take-up spool 34. The detailed enlarged view of the paper tape 31 shown in FIGURE 2 is an example of a pre-programmed problem and answer adapted to be used in the auto reader T for presentation by the math visual display panel 2.

It will be understood that the auto reader as used in conjunction with the Nixie tubes 10 utilizes direct numeral code and there is no digital or analog conversion necessary thereby eliminating the various flip-flops, oscillators and gates, or scaling resistors as required in the more complicated computor technology. The pre-programmed tape 31 shown in FIGURE 2 contains a coded problem and answer intended to be presented by a math visual display panel and comprises a plurality of punched holes 35 strategically positioned in an otherwise imperforate paper tape 31. The pre-programmed tape 31 is passed through the recording head 33 which includes on the one hand a plurality of banks or levels of photoelectric cells 36 and on the other hand a corresponding number of light sources 37. By this arrangement it will be seen that each photoelectric cell 36 will be activated by the passage of a punched hole 35 in the programmed paper tape. This will occur when a hole 35 passes in horizontal alignment with a photo cell and the hole permits the juxtaposed light source 37 to pass therethrough into the photoelectric cell window. As shown in FIGURE 2 there are twenty-three functions or levels capable of being programmed and corresponding to all of the keys 22, 23, 24, 25 and the time delay switch 26. By following the straight lines connecting the various punched holes 35 in this figure, one may readily visualize the coded problem and answer set forth in this example. With the tape traveling in the direction indicated it will be seen that the first hole 35 to the right will activate the #2 level photo-electric cell which as shown in the drawing is designed to program the "1" in the first Nixie tube 10 of the display panel. As the tape continues its longitudinal movement the next hole 35 activates the #23 level photoelectric cell indicating the function of "index" thereby actuating switch means later to be described for preparing the second Nixie tube 10 for programming. By continuing the analysis of the example shown in FIGURE 2 it will be seen that a coded problem is presented which comprises the data "10×9=." The area of the tape representing this coded problem is represented by the segment 31a.

As previously described, when the instructor is manually presenting material for presentation by the display panel 2 by means of one of the control panels 6 and 7, means are provided for regulating either the preception time of presentation or time delay interval between presentation of the problem and its answer. Since neither one of the control panels 6 or 7 are utilized when the instructor is making use of the auto reader T and the pre-programmed tape 31, means must be provided on the tape itself for permitting any variation in the time interval in the presented data. This is readily achieved during the initial programming of the tape 31 by providing a delay period as shown in the tape segment 31b. As the tape 31 travels at a constant speed through the reading head 33 it will thus be seen that the length of the time delay interval between presentation of the problem and its answer will be controlled by the longitudinal dimension of the segment 31b. As the tape 31 continues its travel as shown in FIGURE 2 the punched holes 35 in the answer segment 31c will actuate the next succeeding Nixie tubes 10 to provide the answer, which in this case will be "90." Further travel of the tape 31 brings the "clearing segment" 31d of the tape into the reading head 33. This segment contains but a single punched hole 35 which as will be seen in the drawing is at the #20 level and corresponds with the level of the photoelectric cell which clears the entire display panel of all illuminated data. Again, the longitudinal distance between the last hole 35 in the answer segment 31c and the "clear" hole 35 in the segment 31d will determine the time interval of the complete presentation before clearing thereof.

Contained within the master electronic control unit 5 are the necessary electrical components for receiving, storing and transmitting signals received from either a control panel 6 and 7 or the automatic tape reader T and for presenting the thus programmed data to all of the Nixie tubes 10 of the display panel, or panels, being utilized. FIGURES 5A and 5B of the drawings illustrate a typical arrangement indicative of the apparatus for transmitting an impulse following the depression of one of the keys of a control panel to the first or next succeeding Nixie tube 10 designed to be activated. The schematic diagrams of FIGURES 5A and 5B relate specifically to the arrangement used in connection with the math control panel 7, however, it will be understood that the construction of the circuitry as used in connection with the word control panel 6 or any other arrangement of a control panel, will be basically the same, the only difference being the number of components utilized.

Considering FIGURE 5B it will be seen that each of the keys 22 designating the numerals 0 through 9 is connected to a push button switch 22a normally disposed in an open position. Suitable power supply means 40 are provided including output lines 41 and 42 connected respectively to the two contacts of each of the push button switches 22a. A similar set of push button switches 23a are provided as in FIGURE 5A for transmitting data programmed upon actuation of the keys 23 and 25 and are likewise connected to the power supply means 40 by means of the lines 41 and 42. A suitable number of automatic stepping switches S and S' are provided to service all of the push button switches 22a and 23a.

Upon depression of any one of the keys on the control panel 7 the first or next succeeding contact in the stepping switch S or S' is closed to actuate the appropriate contacts in a stepping switch bank B in accordance with the particular push button 22a or 23a that was actuated by the instructor. A multi-level logic module M is provided for each one of the Nixie tubes 10 contained in the display panel 2 and as will be seen in FIGURES 5A and 5B each level of the module M is electrically connected on the one hand to each contact in the stepping switch bank B and on the other hand through a line 4a forming a portion of the cable 4 leading to the display panel. In this manner it will be seen that any data provided by the depression of one of the push button switches associated with a key in the control panel keyboard will close the first or next succeeding open switch in the stepping switch S or S' thereby actuating the appropriate contacts in the stepping switch bank to store the symbol corresponding to the depressed key in the first available logic module M. A suitable number of levels are provided in the logic modules to handle all possible data which is capable of being fed into the particular module and each level includes its own output line 4a to the respective Nixie tube 10 associated with that module. All of the output lines 4a leading to the Nixie tubes in the panel 2 are contained in the electrical cable 4 and are ultimately connected to the respective contacts provided in the base of the Nixie tube.

Figure 6:
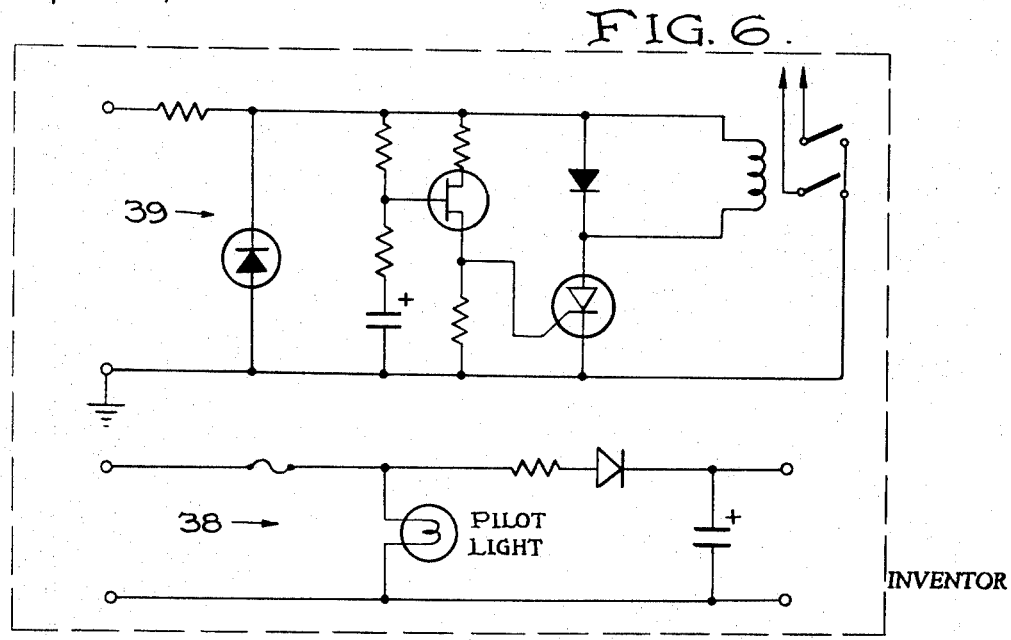
FIGURE 6 is a schematic view illustrating a typical time delay and power supply circuit as used in the master electronic control unit of the present invention.

Also contained within the master electronic control unit 5 is a suitable master power supply 38 and the delay circuit 39 as suggested in FIGURE 6 of the drawings.

The arrangement of the stepping switches, stepping switch banks and logic modules for serving the word control panel 6 are similar to the above described arrrangement relating to the math control panel 7 except that, of course, a greater number of these components are required for providing the much larger number of possible data entries which may be programmed for each of the Nixie tubes 10 in the display panel 1.

When the instructor makes use of the auto tape reader T the passage of the perforated tape 31 through the reading head 33 serves as the actuating means for carrying out the programming steps which are manually achieved when using the control panel 6 or 7. Passage of a beam of light from one of the light sources 37 through a hole 35 in the paper tape 31 causes excitement of the corresponding photoelectric cell 36, which electrical impulse is transmitted by the electrical cable 30 through a circuit leading to one of the stepping switch banks B in the control unit 5. The operation of the Nixie tubes 10 from this point on is similar to that previously described when using one of the control panels 6 or 7.

I claim:

1. A teaching apparatus comprising in combination, a display unit having a plurality of visual exhibitors each of which may be excited to present any of a plurality of selected alpha/numeric symbols, a control unit remote from said display unit and provided with a multi-level logic module electrically connected to each of said exhibitors, a control panel electrically connected to said control unit for supplying selected data to be stored in any number of said modules in a sequential manner, said panel including a plurality of finger-actuated symbol keys each joined to a normally open switch, stepping switch means actuated upon closing of each of said key switches and electrically connected to said modules whereby closing of any of said key switches permits storage of its related symbol within the first available of said modules, said panel provided with additional key means operable to release previously stored data in said modules for presentation from said exhibitors, and variable switch means on said panel manually selected prior to actuation of said additional key means to regulate the time interval of said presentation.

References Cited

UNITED STATES PATENTS

| | | | |
|---|---|---|---|
| 2,984,017 | 5/1961 | Pask | 35—8 |
| 3,091,040 | 5/1963 | Schierhorst | 35—8 X |
| 3,121,959 | 2/1964 | Uttal | 35—9 |
| 3,281,959 | 11/1966 | Kobler et al. | 35—9 X |
| 3,355,819 | 12/1967 | Hannah et al. | 35—9 |

EUGENE R. CAPOZIO, *Primary Examiner.*

WALTER W. NIELSEN, *Assistant Examiner.*

U.S. Cl. X.R.

35—6